UNITED STATES PATENT OFFICE.

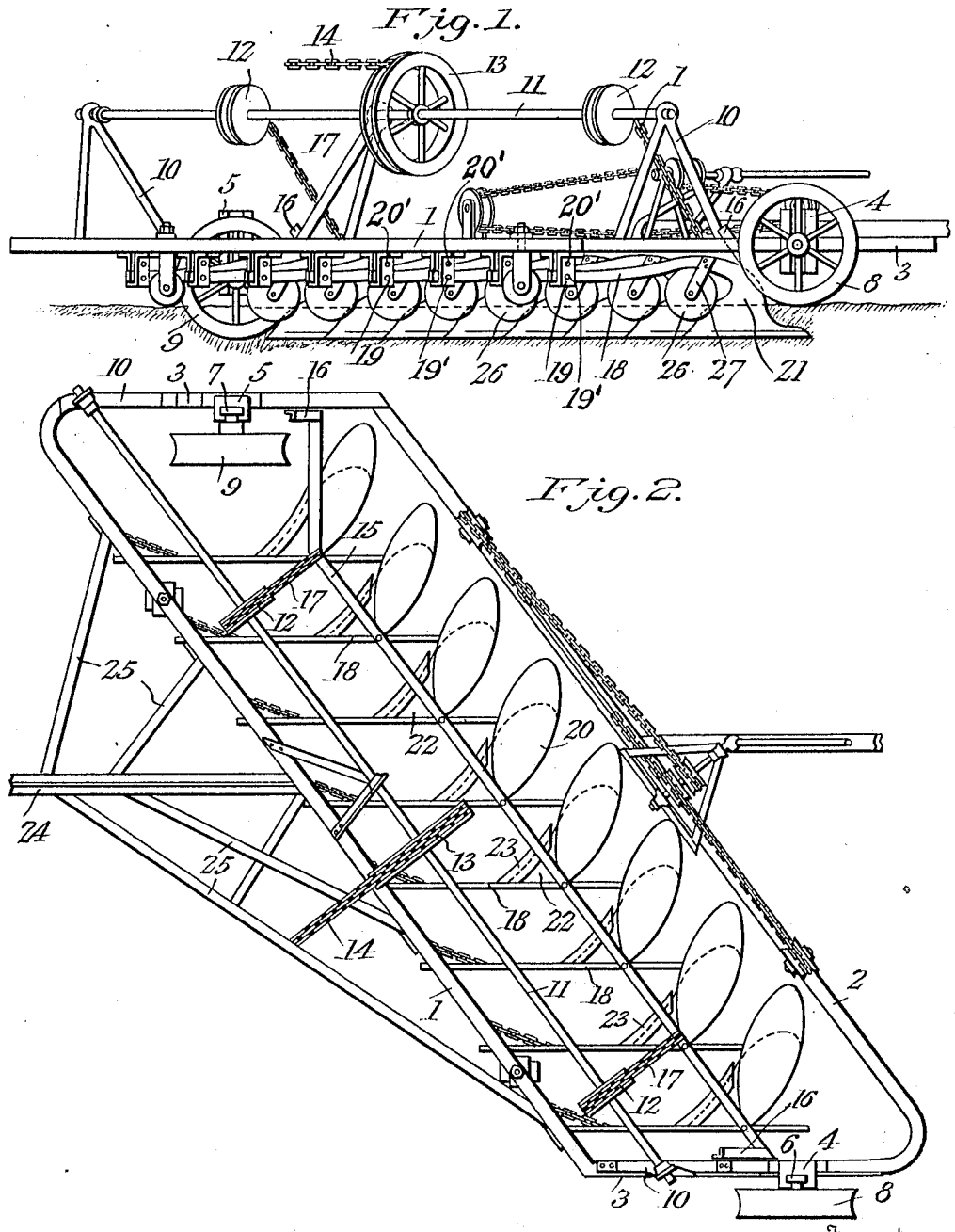

JACOB P. HOLSER, OF WYNANTSKILL, NEW YORK.

GANG-PLOW.

1,035,361.  Specification of Letters Patent.  Patented Aug. 13, 1912.

Application filed March 2, 1910. Serial No. 546,833.

*To all whom it may concern:*

Be it known that I, JACOB P. HOLSER, a citizen of the United States of America, residing at Wynantskill, in the county of Rensselaer and State of New York, have invented new and useful Improvements in Gang-Plows, of which the following is a specification.

This invention relates to gang plows, and it has among its objects to provide a gang plow of simple and improved construction which may be propelled by means of a traction engine or other suitable motive power and by means of which a plurality of furrows may be turned at one operation.

Further objects of the invention are to simplify and improve the general construction and operation of a device of this class.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the invention may be resorted to when desired.

In the drawing,—Figure 1 is a side elevation of a gang plow constructed in accordance with this invention. Fig. 2 is a top plan view of the same.

Corresponding parts in both figures are denoted by like characters of reference.

The frame of the improved gang plow is composed of obliquely disposed front and rear bars 1 and 2 which are suitably connected by end bars 3, 3 which are disposed in parallel relation to each other, as will be seen in Fig. 2. The side bars 3, 3 are equipped with brackets 4 and 5 in which the slides 6 and 7 carrying, respectively, the land wheel 8 and the furrow wheel 9 are supported for vertical movement. Means are to be provided for effecting vertical adjustment of the wheel-carrying slides and to support said slides in suitable position for operation with relation to the frame, but such means are well known and commonly used in this kind of plows, and it has not been deemed necessary to illustrate the same in detail.

The side bars 3—3 of the frame are provided with upwardly extending brackets 10 affording bearings for a shaft 11 having wheels or drums 12 and 13. A chain 14 is suitably connected with the drum 13 and is partially wound upon the latter from which it projects in a forward direction for connection with suitable winding means upon the tractor by means of which the machine is to be propelled. A cross bar 15 is provided with flanged end pieces 16 adapted to engage and to abut upon the side members of the frame, to prevent end thrust of said cross bar. Said cross bar 15 is connected by flexible elements, such as chains 17, with the pulleys or drums 12 upon the shaft 11 upon which said chains are wound reversely to the chain 14 upon the drum 13, so that by pulling the chain 14 to unwind it from the drum 13, the shaft 11 will be rotated to wind the chains 17 upon the drums or pulleys 12, thus elevating the cross bar 15. The latter is suitably connected with the plow beams 18, the front ends of which are hingedly supported in brackets 19 depending from the front bar 1 of the frame. The hinge pins 19' whereby the plow beams are connected with the brackets 19 are preferably disposed at right angles to said beams so that the latter will be able to rise in a vertical plane. The brackets 19 are also preferably provided with auxiliary apertures 20' for the insertion of the hinge pins, thereby enabling the front ends of the plow beams to be mounted at various vertical adjustments. The connections between the plow beams and the cross bar 15 may be rigid, in which case it is necessary for the pins 19' to fit loosely in the beams 18, but this is not necessary or essential, and a loose or a link connection may be employed, if desired. The plows carried by the beams 18 include the mold boards 20, land sides 21 and points 22, the latter being equipped with cutting members 23 of chilled steel adapted to cut through roots and other obstructions.

In the operation of this invention, the plow may be propelled by means of a traction engine of suitable construction with which it is connected by means of a tongue 24 projecting from the front frame bar 1 with which it is connected by reinforcing braces 25. By rotating the shaft 11 the plows may be elevated, the beams 18 being suitably connected with the cross bar 15. By lowering the latter the plows will be lowered to engage the ground at any suitable depth.

Colters 26 have been shown as connected with the plow beams by means of brackets 27; rolling colters have been shown, but it is obvious that others may be substituted and that colters may be altogether dispensed with if preferred.

Having thus described the invention, what is claimed as new, is:—

1. In a gang plow, a frame having end members provided with upstanding brackets, a cross bar having flanged end pieces slidably engaging the inner faces of the end members of the frame to resist end thrust of the cross bar, a shaft supported for rotation upon the brackets, drums upon said shafts having flexible members connected therewith and with the cross bar, and plow carrying beams hingedly connected with the front bar of the frame and suitably connected with the transverse bar.

2. In a device of the character described, a frame having end members, carrying wheels for said frame, plow carrying beams hingedly connected with the front bar of the frame, a cross bar suitably arranged for vertical movement, said cross bar being provided with end members bearing against the inner faces of the end members of the frame to prevent end thrust of said cross bar, the latter being also suitably connected with the plow carrying beams, a shaft supported for rotation above the frame, drums upon said shaft having flexible elements partially wound thereon and connected with the vertically movable cross bar, and means for rotating the shaft to wind the flexible members upon the drums to elevate the cross bar.

In testimony whereof I affix my signature in presence of two witnesses.

JACOB P. HOLSER.

Witnesses:
 LOUIS CRAVER,
 JOHN H. TAYLOR.

Copies of this patent may be obtained for five cents each, by addressing the "Commissioner of Patents, Washington, D. C."